(12) United States Patent
Liu (10) Patent No.: US 10,011,242 B2
(45) Date of Patent: Jul. 3, 2018

(54) VEHICLE DEVICE FOR PROTECTING PASSENGERS FROM BEING THROWN OUT

(71) Applicant: Chun-Nan Liu, Taichung (TW)

(72) Inventor: Chun-Nan Liu, Taichung (TW)

( * ) Notice: Subject to any disclaimer, the term of this patent is extended or adjusted under 35 U.S.C. 154(b) by 0 days.

(21) Appl. No.: 15/437,242

(22) Filed: Feb. 20, 2017

(65) Prior Publication Data

US 2017/0369015 A1 Dec. 28, 2017

(30) Foreign Application Priority Data

Jun. 27, 2016 (TW) .............................. 105120203 A (51) Int. Cl.
| | |
|---|---|
| *B60R 21/0132* | (2006.01) |
| *B60R 21/013* | (2006.01) |
| *B60R 21/13* | (2006.01) |
| *B60J 5/04* | (2006.01) |
| *B60R 21/01* | (2006.01) |

(52) U.S. Cl.
CPC ......... *B60R 21/0132* (2013.01); *B60J 5/0468* (2013.01); *B60R 21/13* (2013.01); *B60R 2021/01013* (2013.01)

(58) Field of Classification Search
CPC . B60R 21/0132; B60R 21/232; B60R 21/013; B60R 21/08; B60J 1/2011; B60J 1/2025; B60J 1/2027
See application file for complete search history.

(56) References Cited

U.S. PATENT DOCUMENTS

| | | | | | |
|---|---|---|---|---|---|
| 5,211,442 | A | * | 5/1993 | Shikano ................. | B60J 1/2011 160/32 |
| 5,524,694 | A | * | 6/1996 | Arapis ................... | B60J 1/2011 160/354 |
| 6,000,715 | A | * | 12/1999 | Tschaeschke ........... | B60R 21/08 280/729 |
| 2004/0002801 | A1 | * | 1/2004 | Ide ........................ | B60R 21/013 701/45 |
| 2004/0002802 | A1 | * | 1/2004 | Ide ........................ | B60R 21/013 701/45 |
| 2004/0056457 | A1 | * | 3/2004 | Bossecker ............. | B60R 21/232 280/730.2 |
| 2005/0116450 | A1 | * | 6/2005 | Noguchi ............... | B60R 21/232 280/730.2 |

(Continued)

FOREIGN PATENT DOCUMENTS

| | | | | |
|---|---|---|---|---|
| DE | 4318556 | C1 * | 9/1994 | ............ B60J 1/2011 |
| FR | 2934203 | A1 * | 1/2010 | ............ B60J 1/2025 |

*Primary Examiner* — Yuri Kan (74) *Attorney, Agent, or Firm* — Ming Chow; Sinorica, LLC (57) ABSTRACT

A vehicle device for protecting passengers from being thrown out is disposed at an inner side of a window of a vehicle. The vehicle device includes two rail units disposed at two opposing sides of the window and a block unit disposed between the rail units. The block unit is connected with a drive unit. The drive unit is connected with a control unit. When the control unit detects that the vehicle is about to roll, the control unit will actuate the drive unit to drive the block unit so that the block unit is rapidly unfolded to block the entire window. Thereby, when the vehicle is rolling, the vehicle device can effectively protect the passengers from being thrown out of the vehicle, improving the safety of the vehicle greatly.

14 Claims, 8 Drawing Sheets

(56) References Cited

U.S. PATENT DOCUMENTS

| | | | | |
|---|---|---|---|---|
| 2008/0034668 A1* | 2/2008 | Fischer | ............... | B60J 1/2027 49/502 |
| 2009/0139670 A1* | 6/2009 | Kruger | ............... | B60J 1/2027 160/370.22 |
| 2012/0048489 A1* | 3/2012 | Oh | ............... | B60J 1/2025 160/370.22 |
| 2015/0174990 A1* | 6/2015 | Choi | ............... | B60J 1/2011 160/5 |

* cited by examiner

VEHICLE DEVICE FOR PROTECTING PASSENGERS FROM BEING THROWN OUT

FIELD OF THE INVENTION

The present invention relates to a vehicle device, and more particularly to a vehicle device for protecting passengers from being thrown out.

BACKGROUND OF THE INVENTION

These days, for the safety of the passengers, most vehicles are equipped with airbags inside the vehicles. The airbags are connected with an inflator and several detectors. When any one of the detectors detects an impact against the vehicle, the inflator instantly generates a large amount of gas to the airbags so that the airbags are inflated instantly to prevent the head and chest of the passengers from colliding with the hard objects in the vehicle to achieve the purpose of protecting the passengers.

Although the above-mentioned airbags can protect the safety of the passengers, the inventor observes that if the vehicle is rolling during the accident, the airbags are not fixed to the vehicle after being inflated and the airbags will deflate slowly. The passengers may be thrown out of the vehicle due to violent shaking and the centrifugal force caused by the rolling of the vehicle, resulting in serious casualties. Five-point seat belts are developed for effectively retaining the passengers on the seats, but the five-point seat belt is very complicated for use and costly. Therefore, it is only used to racing cars or sports cars. It is not widely used to general vehicles. Accordingly, the inventor of the present invention has devoted himself based on his many years of practical experiences to solve these problems.

SUMMARY OF THE INVENTION

The primary object of the present invention is to provide a vehicle device for protecting passengers from being thrown out. When the vehicle is rolling, the vehicle device is capable of protecting passengers from being thrown out of the vehicle, improving the safety of the vehicle greatly.

In order to achieve the aforesaid object, the vehicle device for protecting passengers from being thrown out of the present invention is disposed at an inner side of a window of a vehicle. The vehicle device comprises two rail units, a block unit, a drive unit, and a control unit. The two rail units are disposed at two opposing sides of the window. Two ends of each rail unit are defined as a first end and a second end, respectively. The block unit is made of a flexible material and foldable. The block unit is disposed between the rail units. One end of the block unit is fixed to the first ends of the rail units. Another end of the block unit is slidable toward the second ends of the rail units so that the block unit can be in a folded state or an unfolded state. Wherein, when in the folded state, the block unit is folded at the first ends of the rail units; when in the unfolded state, the block unit is unfolded from the first ends toward the second ends of the rail units to block the window. The drive unit is connected with the block unit for driving the block unit to the unfolded state from the folded state. The control unit is connected with the drive unit for controlling the drive unit to drive the block unit to be in the unfolded state when the vehicle is detected to be about to roll.

Thereby, when the control unit detects that the vehicle is about to roll, the control unit will transmit a signal to the drive unit. The block unit is driven from the folded state to the unfolded state to block the entire window. Thereby, when the vehicle is rolling, the vehicle device of the present invention can effectively protect the passengers from being thrown out of the vehicle, improving the safety of the vehicle greatly.

DETAILED DESCRIPTION OF THE PREFERRED EMBODIMENTS

Embodiments of the present invention will now be described, by way of example only, with reference to the accompanying drawings.

Figure 1:
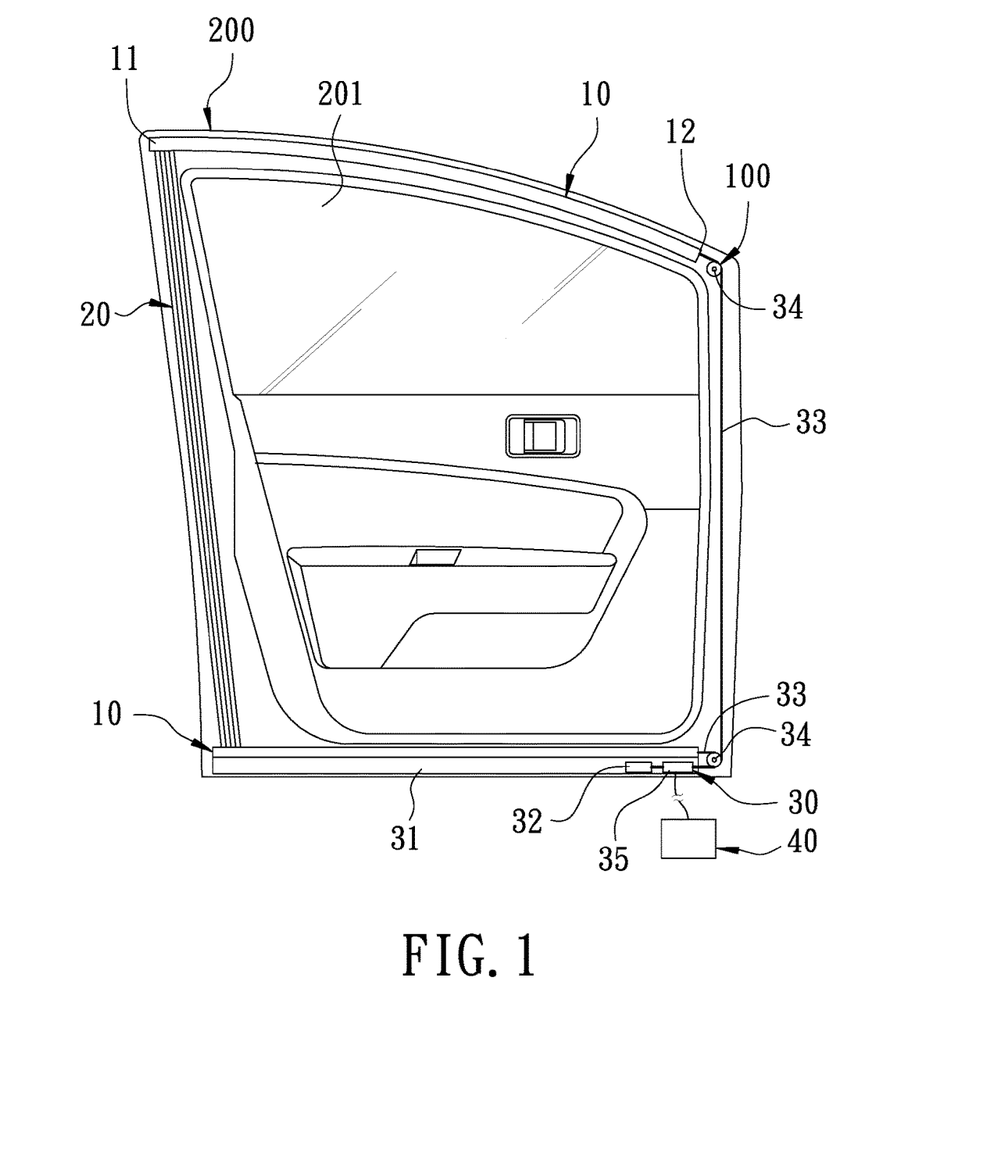
FIG. 1 is a schematic view in accordance with a first embodiment of the present invention.

FIG. 1 is a schematic view in accordance with a first embodiment of the present invention. The present invention discloses a vehicle device 100 for protecting passengers from being thrown out, which can be disposed at an inner side of a window 201 of a vehicle 200. In this embodiment, the vehicle device 100 is disposed in the vehicle body of the vehicle 200 corresponding to the vehicle door, but not limited thereto. The vehicle device of the present invention may be directly disposed at the vehicle door, or in front of or in back of a front/rear windshield. The vehicle device 100 comprises two rail units 10, a block unit 20, a drive unit 30, and a control unit 40.

The two rail units 10 are disposed at two opposing sides of the window 201. Two ends of each rail unit 10 are defined as a first end 11 and a second end 12, respectively.

Figure 5:
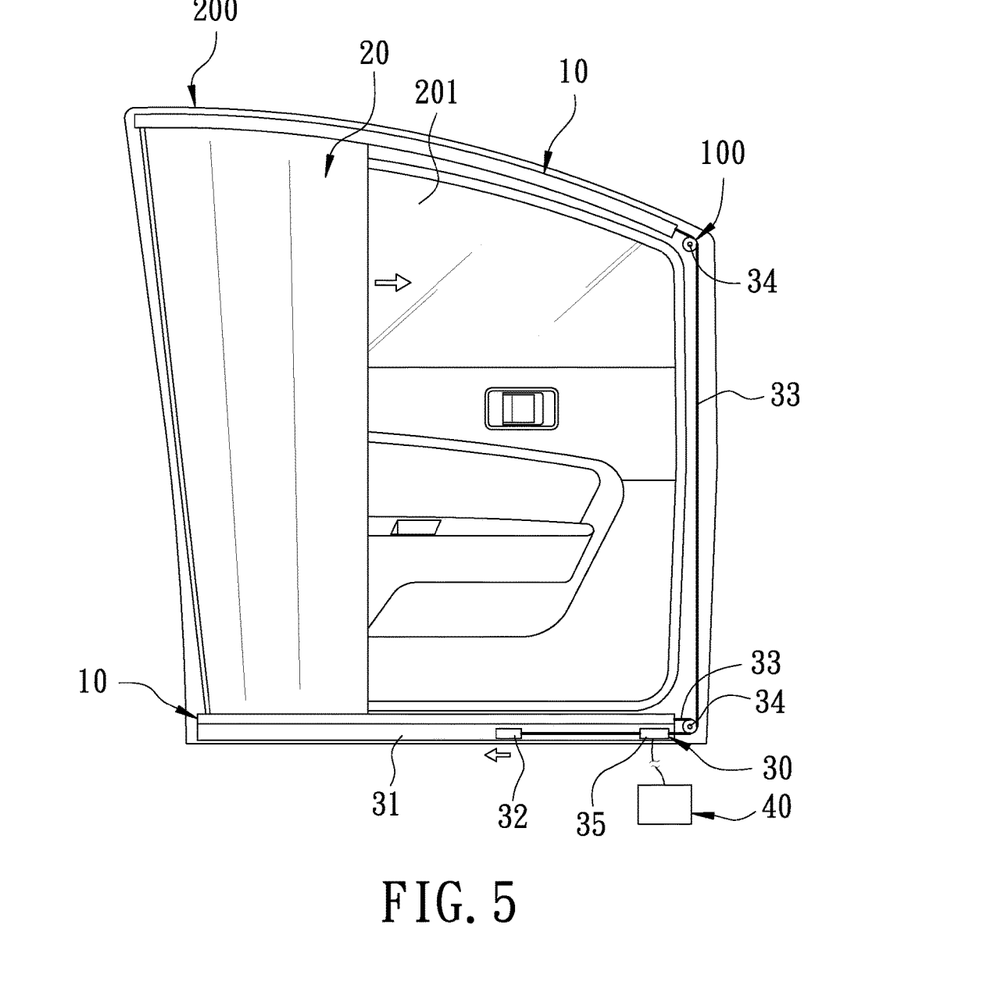
FIG. 5 is a schematic view of the first embodiment of the present invention when in use.

The block unit 20 is made of a flexible material and foldable, such as a fabric, a net, and the like. The block unit 20 is disposed between the rail units 10. One end of the block unit 20 is fixed to the first ends 11 of the rail units 10, and another end of the block unit 20 is slidable toward the second ends 12 of the rail units 10, such that the block unit 20 may be in a folded state or an unfolded state. Wherein, in the folded state, the block unit 20 is folded at the first ends 11 of the rail units 10; in the unfolded state, as shown in FIG. 5, the block unit 20 is unfolded from the first ends 11 toward the second ends 12 of the rail units 10 to block the entire window 201.

The drive unit 30 is connected with the block unit 20 for driving the block unit 20 to the unfolded state from the folded state. In this embodiment, the drive unit 30 includes a tube 31. One end of the tube 31 is slidably provided with a drive block 32. The drive unit 30 includes ropes 33 each disposed in the respective rail units 10. First ends of the ropes 33 are connected to the block unit 20. Second ends of the ropes 33 are inserted through the second ends 12 of the rail units 10, and wound around a plurality of pulleys 34 disposed between the rail units 10 and the tube 31, and then inserted into the tube 31 and connected to the drive block 32. The drive unit 30 further includes an inflator 35. The inflator 35 is located at one side of the drive block 32, connected with the ropes 33. The inflator 35 is configured to generate a large amount of gas at the moment of being actuated so as to urge the drive block 32 to slide rapidly toward the other end of the tube 31. The inflator 35 is mainly composed of sodium azide ($NaN_3$) or ammonium nitrate ($NH_4NO_3$) and other substances in cooperation with an igniter. The structure and principle of the inflator 35 are widely used to airbags of a vehicle, and won't be described hereinafter.

The control unit 40 is connected with the inflator 35 of the drive unit 30 for controlling the drive unit 30 to drive the block unit 20 to be in the unfolded state when the vehicle 200 is detected to be about to roll. In this embodiment, the control unit 40 includes a sensor, such as a gyroscope, for detecting the horizontal state of the vehicle 200 to determine whether the vehicle 200 is about to roll.

Figure 2:
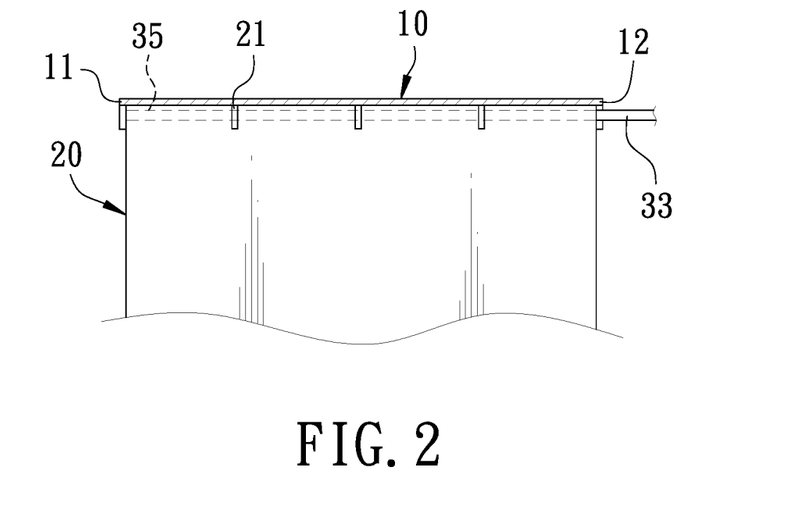
FIG. 2 is a sectional view of a block unit in accordance with the first embodiment of the present invention.
Figure 3:
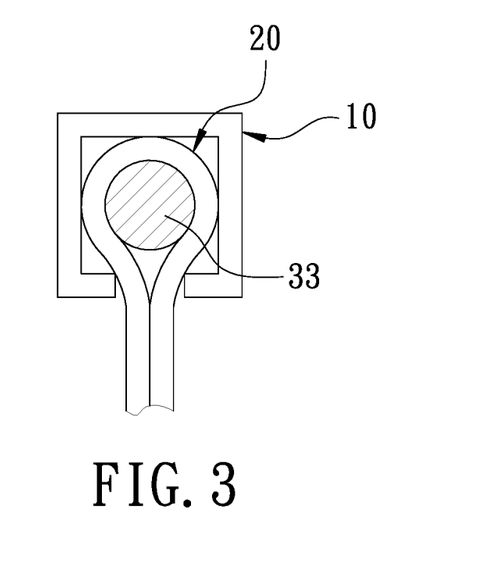
FIG. 3 is a sectional view of the block unit seen from another direction in accordance with the first embodiment of the present invention.
Figure 4:
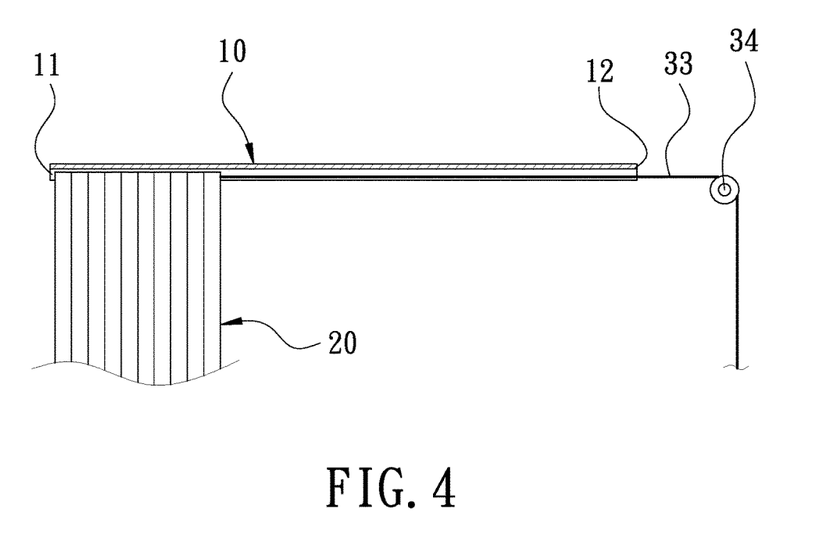
FIG. 4 is a schematic view of the block unit in a folded state in accordance with the first embodiment of the present invention.

FIG. 2 and FIG. 3 are sectional views of the block unit in accordance with the first embodiment of the present invention, showing the connection between the block unit 20 and the drive unit 30. In this embodiment, two sides of the block unit 20 are wound around the corresponding ropes 33. The block unit 20 is provided with a plurality of fixing portions 21 spaced along the longitudinal direction of the ropes 33. The fixing portions 21 are adapted to fix a relative position between the block unit 20 and the ropes 33. As shown in FIG. 4, the portion between every two of the fixing portions 21 of the block unit 20 is foldable. The block unit 20 is secured to the ropes 33 by sewing so that the fixing portion 21 is formed at each stitching.

Referring to FIG. 1 and FIG. 5, when the vehicle 200 is in the normal running state, as shown in FIG. 1, the block unit 20 is in the folded state and is folded at the first ends 11 of the rail units 10. When the control unit 40 detects that the vehicle 200 is about to roll, as shown in FIG. 5, the control unit 40 activates the inflator 35 to instantly generate a large amount of gas. The drive block 32 is pushed to the other end of the tube 31, so that the ropes 33 are pulled by the drive block 32 and guided by the pulleys 34. The block unit 20 is rapidly unfolded from the first ends 11 toward the second ends 12 of the rail units 10. That is, the block unit 20 is driven from the folded state to the unfolded state to block the entire window 201. Thereby, when the vehicle 200 is rolling, the block unit 20 can effectively protect the passengers from being thrown out of the vehicle, improving the safety of the vehicle greatly.

Figure 6:
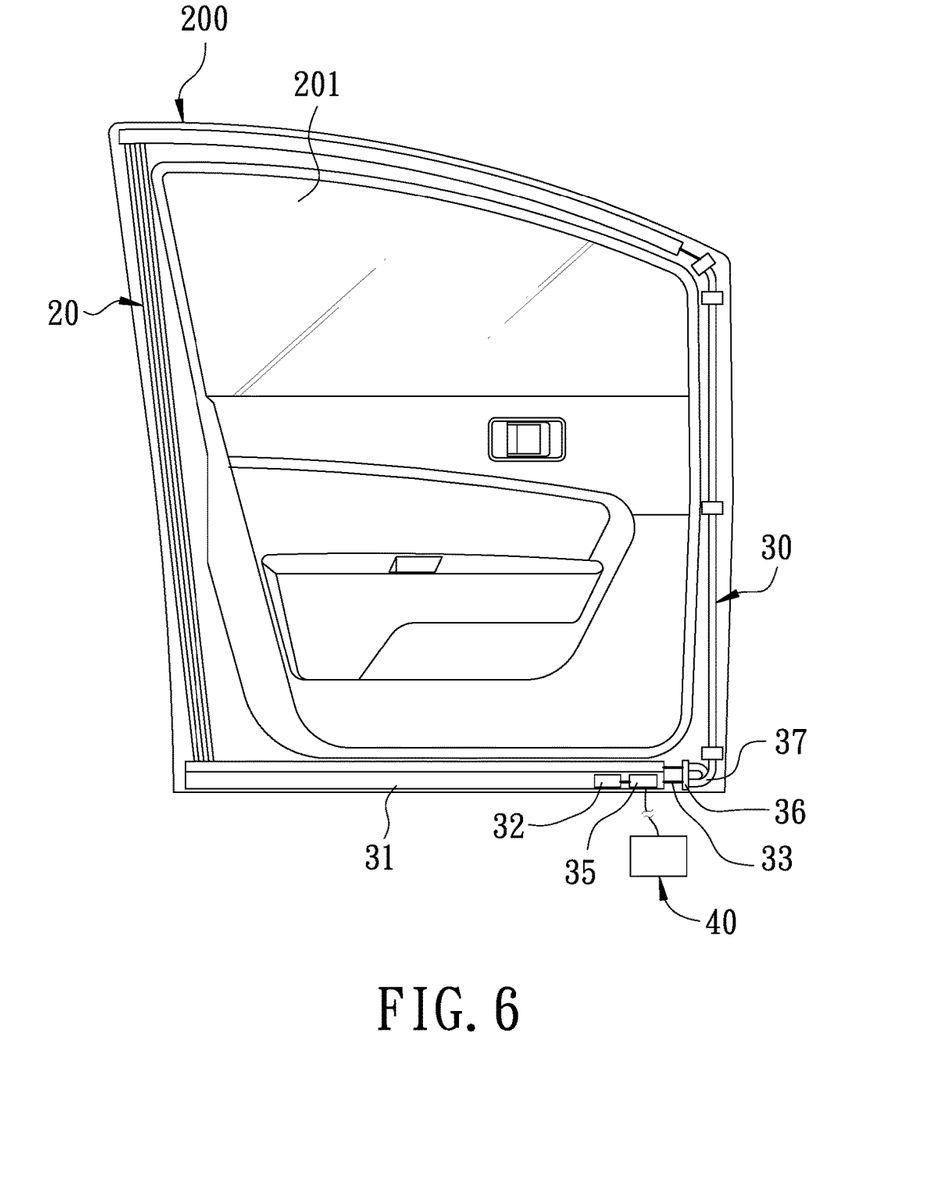
FIG. 6 is a schematic view in accordance with a second embodiment of the present invention.
Figure 7:
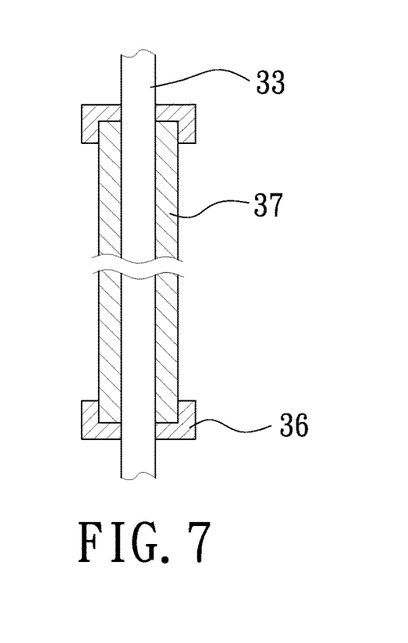
FIG. 7 is a sectional view of a guide tube in accordance with the second embodiment of the present invention.
Figure 8:
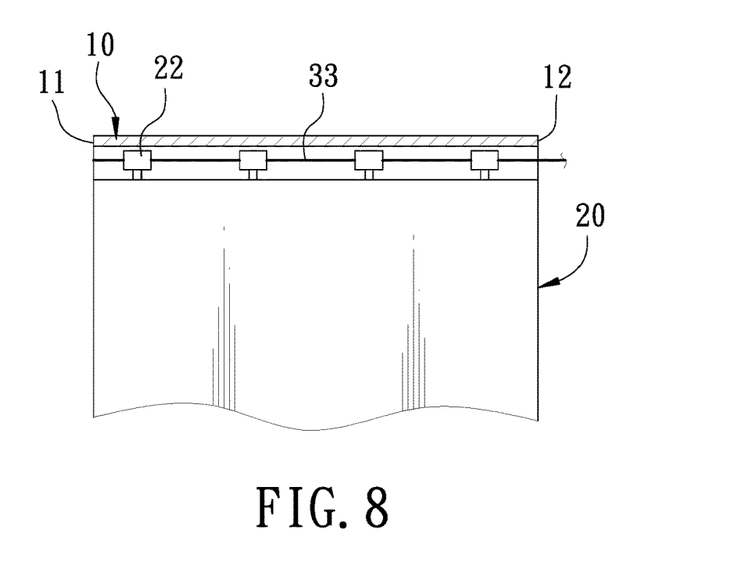
FIG. 8 is a sectional view of a block unit in accordance with the second embodiment of the present invention.

FIG. 6 is a schematic view in accordance with a second embodiment of the present invention. FIG. 7 is a sectional view of the guide tube in accordance with the second embodiment of the present invention. FIG. 8 is a sectional view of the block unit in accordance with the second embodiment of the present invention. The vehicle device 100 of the second embodiment is substantially similar to the first embodiment with the exceptions described hereinafter. The drive unit 30 is provided with a plurality of fixing members 36 between the rail units 10 and the tube 31 and a plurality of guide tubes 37 along the fixing members 36. The second ends of the ropes 33 are inserted through the guide tubes 37, and then inserted into tube 31 and connected to the drive block 32. Furthermore, two sides of the block unit 20 are provided with a plurality of spaced slide blocks 22. The slide blocks 22 are slidably connected to the rail units 10, so that the block unit 20 is connected between the rail units 10. The ropes 33 are further connected to the slide blocks 22. Thereby, when the control unit 40 detects that the vehicle 200 is about to roll, the control unit 40 activates the inflator 35 to instantly generate a large amount of gas. The drive block 32 is pushed by the gas generated by the inflator 35, so that the ropes 33 are guided by the guide tubes 37 to drive the block unit 20 from the folded state to the unfolded state. The second embodiment also provides the same effect as the first embodiment to protect the passengers from being thrown out of the vehicle.

Figure 9:
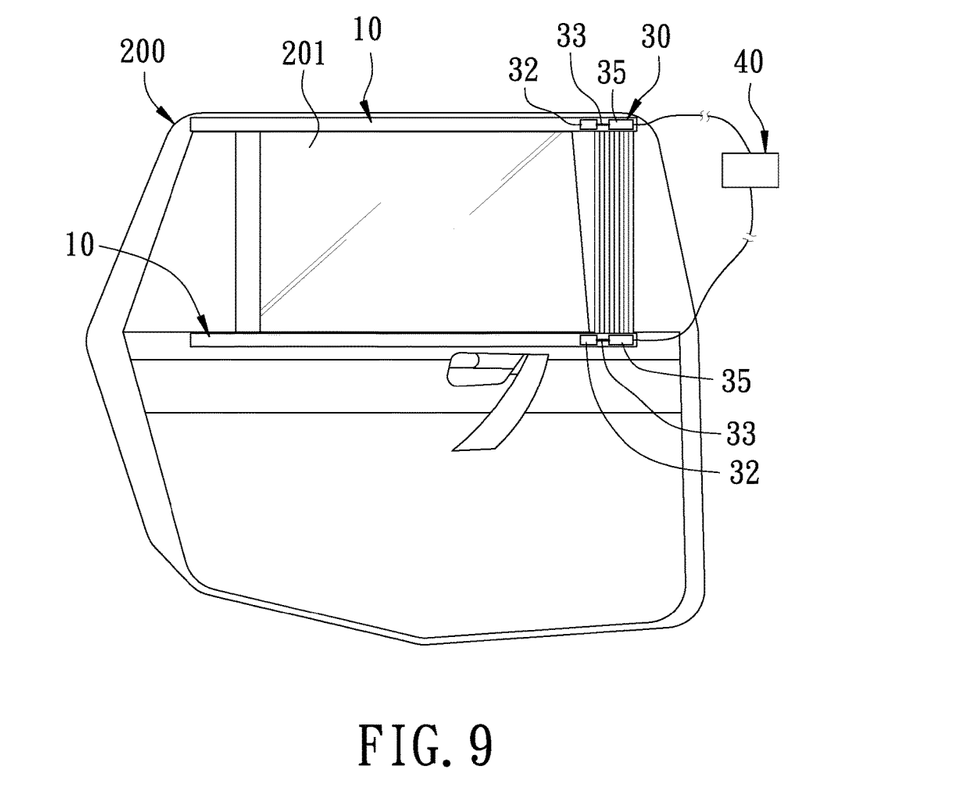
FIG. 9 is a schematic view in accordance with a third embodiment of the present invention.
Figure 10:
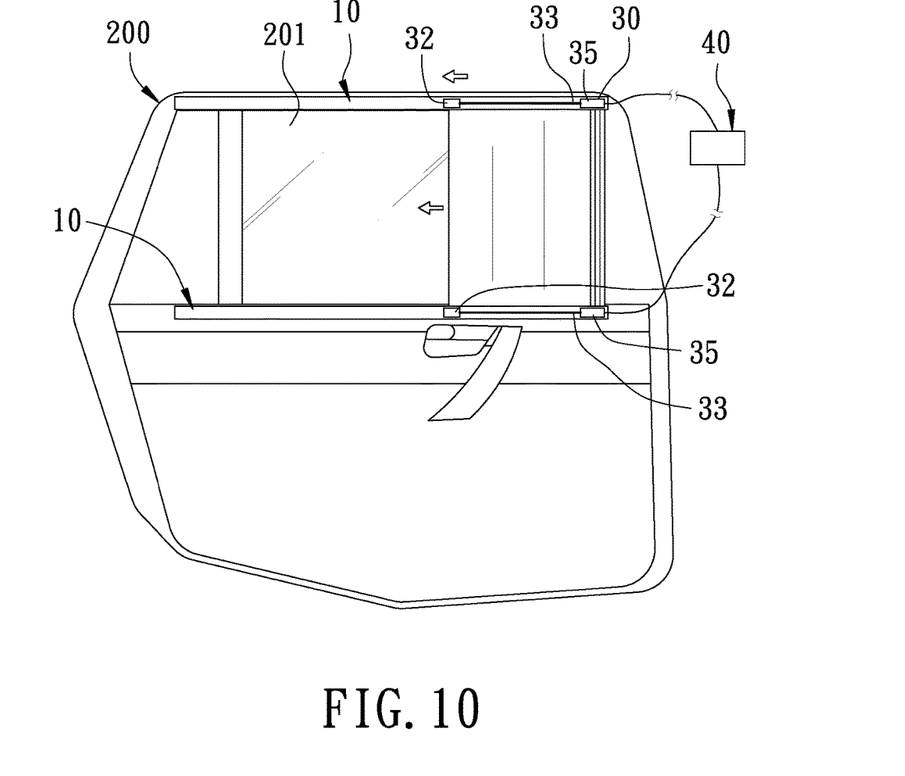
FIG. 10 is a schematic view of the third embodiment of the present invention when in use.

FIG. 9 is a schematic view in accordance with a third embodiment of the present invention. FIG. 10 is a schematic view of the third embodiment of the present invention when in use. The vehicle device 100 of the third embodiment is substantially similar to the first embodiment with the exceptions described hereinafter. The vehicle device 100 is directly disposed on the vehicle door of the vehicle 200. The drive unit 30 is provided with the drive block 32 corresponding to each of the rail units 10. The drive block 32 is slidably disposed in the rail unit 10 and located between the second end 12 and the block unit 20. The drive block 32 is further connected to a first end of a rope 33. A second end of the rope 33 is connected to the block unit 20. The drive unit 30 further includes the inflator 35 between the drive block 32 and the block unit 20. The inflator 35 is electrically connected with the control unit 40. Thereby, when the control unit 40 detects that the vehicle 200 is about to roll, the control unit 40 activates the inflator 35 to instantly generate a large amount of gas. The drive block 32 is pushed by the gas generated by the inflator 35 to slide toward the second end 12, so that the rope 33 is pulled to drive the block unit 20 from the folded state to the unfolded state. The third embodiment also provides the same effect as the first embodiment to protect the passengers from being thrown out of the vehicle.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A vehicle device for protecting passengers from being thrown out, disposed at an inner side of a window of a vehicle, comprising:

two rail units, disposed at two opposing sides of the window, two ends of each rail unit being defined as a first end and a second end respectively;

a block unit, made of a flexible material and being foldable, the block unit being disposed between the rail units, one end of the block unit being fixed to the first ends of the rail units, another end of the block unit being slidable toward the second ends of the rail units so that the block unit can be in a folded state or an unfolded state, wherein, when in the folded state, the block unit is folded at the first ends of the rail units; when in the unfolded state, the block unit is unfolded from the first ends toward the second ends of the rail units to block the window;

a drive unit, connected with the block unit, for driving the block unit to the unfolded state from the folded state;

a control unit, connected with the drive unit, for controlling the drive unit to drive the block unit to be in the unfolded state when the vehicle is detected to be about to roll; and the drive unit includes a tube, one end of the tube is slidably provided with a drive block, the drive unit includes ropes each disposed in the respective rail units, first ends of the ropes are connected to the block unit, second ends of the ropes are inserted through the second ends of the rail units and further inserted into the tube and connected to the drive block, the drive unit further includes an inflator, the inflator is located at one side of the drive block, connected with the ropes, and the inflator is electrically connected with the control unit.

2. The vehicle device for protecting passengers from being thrown out as claimed in claim 1, wherein the drive unit further includes a plurality of pulleys, the plurality of pulleys are disposed between the rail units and the tube, and the second ends of the ropes are wound around the plurality of pulleys and then inserted into the tube and connected to the drive block.

3. The vehicle device for protecting passengers from being thrown out as claimed in claim 1, wherein the drive unit further includes a plurality of guide tubes, the plurality of guide tubes are disposed between the rail units and the tube, the second ends of the ropes are inserted through the guide tubes and then inserted into the tube and connected to the drive block.

4. The vehicle device for protecting passengers from being thrown out as claimed in claim 1, wherein two sides of the block unit are wound around corresponding ropes, the block unit is provided with a plurality of fixing portions spaced along a longitudinal direction of the ropes, the fixing portions are adapted to fix a relative position between the block unit and the ropes, and a portion between every two of the fixing portions of the block unit is foldable.

5. The vehicle device for protecting passengers from being thrown out as claimed in claim 1, wherein two sides of the block unit are provided with a plurality of spaced slide blocks, the spaced slide blocks are slidably connected to the rail units so that the block unit is connected between the rail units, and the ropes are further connected to the spaced slide blocks.

6. The vehicle device for protecting passengers from being thrown out as claimed in claim 1, wherein the block unit is a fabric.

7. The vehicle device for protecting passengers from being thrown out as claimed in claim 1, wherein the control unit includes a sensor for detecting a horizontal state of the vehicle to determine whether the vehicle is about to roll.

8. The vehicle device for protecting passengers from being thrown out as claimed in claim 7, wherein the sensor is a gyroscope.

9. A vehicle device for protecting passengers from being thrown out, disposed at an inner side of a window of a vehicle, comprising:

two rail units, disposed at two opposing sides of the window, two ends of each rail unit being defined as a first end and a second end respectively;

a block unit, made of a flexible material and being foldable, the block unit being disposed between the rail units, one end of the block unit being fixed to the first ends of the rail units, another end of the block unit being slidable toward the second ends of the rail units so that the block unit can be in a folded state or an unfolded state, wherein, when in the folded state, the block unit is folded at the first ends of the rail units; when in the unfolded state, the block unit is unfolded from the first ends toward the second ends of the rail units to block the window;

a drive unit, connected with the block unit, for driving the block unit to the unfolded state from the folded state;

a control unit, connected with the drive unit, for controlling the drive unit to drive the block unit to be in the unfolded state when the vehicle is detected to be about to roll; and the drive unit is provided with a drive block corresponding to each rail unit, the drive block is slidably disposed in the rail unit and located between the second end and the block unit, the drive block is further connected to a first end of a rope, a second end of the rope is connected to the block unit, the drive unit further includes an inflator between the drive block and the block unit, and the inflator is electrically connected with the control unit.

10. The vehicle device for protecting passengers from being thrown out as claimed in claim 9, wherein two sides of the block unit are wound around corresponding ropes, the block unit is provided with a plurality of fixing portions spaced along a longitudinal direction of the ropes, the fixing portions are adapted to fix a relative position between the block unit and the ropes, and a portion between every two of the fixing portions of the block unit is foldable.

11. The vehicle device for protecting passengers from being thrown out as claimed in claim 9, wherein two sides of the block unit are provided with a plurality of spaced slide blocks, the spaced slide blocks are slidably connected to the rail units so that the block unit is connected between the rail units, and the ropes are further connected to the spaced slide blocks.

12. The vehicle device for protecting passengers from being thrown out as claimed in claim 9, wherein the block unit is a fabric.

13. The vehicle device for protecting passengers from being thrown out as claimed in claim 9, wherein the control unit includes a sensor for detecting a horizontal state of the vehicle to determine whether the vehicle is about to roll.

14. The vehicle device for protecting passengers from being thrown out as claimed in claim 13, wherein the sensor is a gyroscope.

* * * * *